F. J. SEYMOUR.
Machine for Washing and Concentrating Ores.
No. 228,125. Patented May 25, 1880.
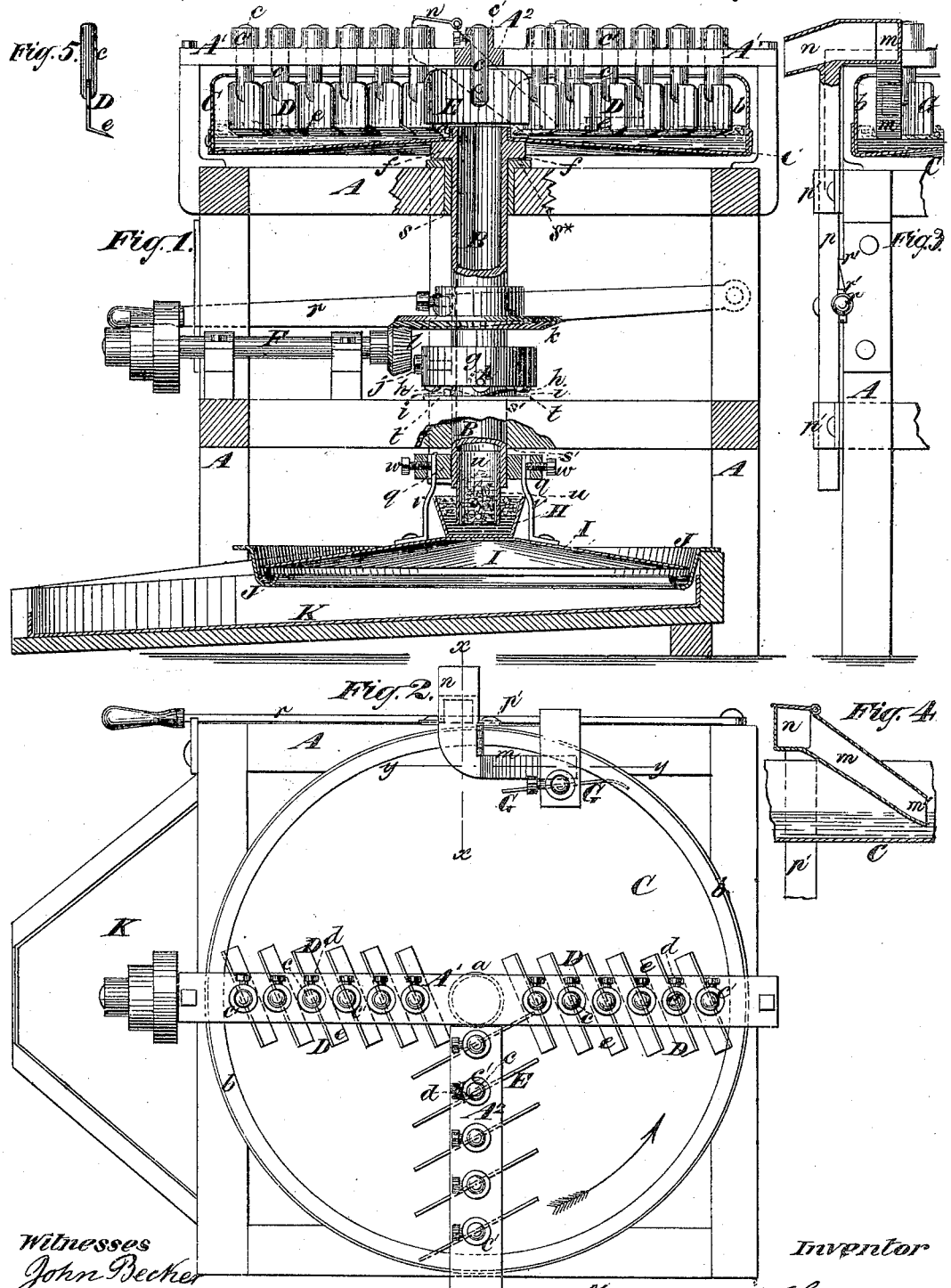

UNITED STATES PATENT OFFICE.

FREDERICK J. SEYMOUR, OF WOLCOTTVILLE, CONNECTICUT.

MACHINE FOR WASHING AND CONCENTRATING ORES.

SPECIFICATION forming part of Letters Patent No. 228,125, dated May 25, 1880.

Application filed January 21, 1880.

*To all whom it may concern:*

Be it known that I, FREDERICK J. SEYMOUR, of Wolcottville, in the county of Litchfield and State of Connecticut, have invented certain new and useful Improvements in Machines for Washing and Concentrating Ores and other substances, of which the following is a specification, reference being had to the accompanying drawings.

This invention embraces improvements applicable with especial advantage to machines for washing or concentrating auriferous and other ores or other substances, such as are the subject of a former application of mine for Letters Patent, which was filed August 21, 1879; but they may be in part applicable to other machines with rotary pans.

An important feature of the machine illustrated in my aforesaid application consists in the combination of a rotary pan with hollow upright shaft and central overflow and a series of agitators or blades arranged to operate within said pan on the material contained therein in opposition to the centrifugal force developed in said material by the rotation of the pan.

One part of this invention consists in a novel system of agitators or blades in combination with such a rotary pan.

Another part of the invention consists in an improvement in the construction and arrangement of the bearing for the support of the weight of the rotary pan and shaft, and of mechanism for giving a jumping motion to said pan and shaft, whereby the jumping devices are relieved from the concussion consequent upon the descent of the pan and shaft, and more efficient provision made for regulating the height of the jumping motion.

The invention also consists in novel means of effecting the continuous removal of the heavy concentrated material accumulating in the outer portion, or portion farthest from the center of the rotary pan, during and without interruption to the washing or concentrating operation.

The invention further consists in the combination, with a rotary pan having a hollow upright shaft and provision for a central overflow through said shaft, of a basin into which said shaft dips, and which is so secured to the said shaft as to rotate with it, and a convex amalgamating-plate, also attached to the said shaft, and so arranged below the said basin that the material overflowing from the pan through said shaft may be caused to pass through quicksilver in said basin, and afterward caused to flow over said amalgamating-plate. The said amalgamating-plate may have arranged below its outer edge an annular trough, in which quicksilver may be placed for catching any precious metal that may pass over the said outer edge.

Figure 1 in the drawings is a central vertical section of a machine embodying these improvements. Fig. 2 is a plan of the same. Fig. 3 is a vertical section in the line $x\ x$ of Fig. 2, showing the arrangement of the adjustable apparatus for the removal of the heavy concentrated material from the pan. Fig. 4 is a vertical section of the said apparatus in the line $y\ y$ of Fig. 2. Fig. 5 is a side view of one of the agitators.

A A' A² designate the framing of the machine, containing bearings at $s\ s'$, in which the central hollow upright shaft, B, is free to rotate and to have a certain degree of vertical or longitudinal motion. C is the pan, of circular form, with an opening in the center, over the central cavity of the hollow shaft, said opening being formed with an upwardly-projecting rim, which is not so high as the outer rim, $b$, of the pan. The bottom of the pan is shown as having a downward inclination from the bottom of the inner rim, $a$, to the outer circumference or rim, $b$.

E E and D D are the agitators or blades employed in the pan for the purpose of producing a tendency to counteract the effect of centrifugal force developed in the contents of the pan by its rotation. The blades have all broad surfaces, and are set at such obliquity to imaginary radial planes passing through their centers and through the axis of the shaft and pan that their faces, or those surfaces toward which the pan rotates, present themselves inward or toward the center of the pan, in which respects the said blades resemble those represented in my former application for patent. They are all made with straight stocks $c\ c$, which are fitted into upright sockets $c'$ $c'$ provided in the upper cross-bars, A' A², of the framing, and are secured in the said sockets by set-screws $d$ $d$, which mode of fitting and securing them provides for their being adjusted separately at different heights and at different angles.

Those blades E E may consist simply of flat plates, and I prefer to so set them that their lower edges are just about level with or very slightly below the level of the edge of the inner rim, $a$, of the pan. Those D D have their lower parts bent or turned forward, as shown at $e$ in Figs. 1, 2, and 5, toward the center of the pan, and they are set deeper in the pan than E E.

The hollow shaft B is provided at or near its upper end, just below the pan, with a permanently or firmly secured collar, $f$, for which a firm or solid bearing is provided at $s^*$ by a broad flange around the upper part of the upper shaft-bearing, $s$, or by any other suitable means to take the whole weight of the pan and shaft. The said shaft is also provided on its lower part, just above the lower shaft-bearing, $s'$, with a vertically-adjustable collar, $g$, which is fitted with a number of anti-friction rollers, $h$ $h$, which project below it, and below which there are provided on the framing, or on the upper flange, $t$, of the lower shaft-bearing, a series of inclined steps, $i$ $i$, with abrupt terminations, the said steps and the collar $g$ and its rollers being so arranged that, as rotary motion is given to the shaft and pan, the said rollers may run up the said steps, and so cause the shaft and pan to be lifted, and that when the rollers pass over the abruptly-terminating higher parts of the steps $i$ $i$ and the shaft and pan drop, the fall will be arrested by the upper collar, $f$, falling to its bearing, and the rollers will not reach and strike the steps or lower bearing. By this means an easy jumping motion is obtained without any liability to injury of the inclined steps and rollers, which constitute the mechanism for obtaining the jumping motion of the pan. The height of the jumping motion may be varied by adjusting the lower collar, $g$, higher or lower on the shaft. To provide for this adjustment it is represented as secured to the shaft by a set-screw, $j$.

To provide for the rotary motion of the shaft B and pan C, the shaft is represented as geared above the lower collar, $g$, by bevel-gearing $k$ $l$, with a horizontal driving-shaft, F.

The device for taking the heavy concentrated material from the pan as the latter rotates consists of a covered stationary trunk, $m$ $n$, the principal part, $m$, of which dips into the pan at an inclination, but presents an open upright mouth, $m'$, as shown in Fig. 4, and is arranged near the outer rim, $b$, tangential thereto, as shown in Fig. 4. The upper part, $n$, of the said trunk is at an angle to $m$, and has a radial direction relatively to the pan, as shown in Fig. 2, and it inclines slightly downward over the outside of the rim $b$, as shown in Fig. 2. The mouth $m'$ is presented in such a direction that the pan rotates toward it, as shown by the arrow in Fig. 2. The said trunk, though stationary when in operation, is capable of being raised or lowered to adjust the depth at which it operates in the pan, and it is also capable of being raised up above the contents of the pan when not desired to operate; and for these purposes it is attached to a stout vertical sliding rod, $p$, which works in guides $p$ $p'$ on the outside of the framing, and which is connected with a hand-lever, $r$, which is locked in any position in one of a series of notches, $r'$ $r'$, on the frame.

Near the mouth $m'$ of this trunk there is a stationary blade, G, arranged obliquely to the rim $b$ of the pan, to serve as a guard to the trunk, for the purpose of preventing the heavy concentrated matters in the pan from being carried up the outside of the trunk by the rotary motion of the pan, which is intended to force them through the mouth $m'$ up the inclined part $m$, and out through $n$ into any suitable receptacle.

On the lower part of the exterior of the shaft B there is constructed or firmly secured a collar, $q$, from which are suspended the basin H, which may contain quicksilver, and the convex distributing or amalgamating plate I, which is like a broad outwardly-inclined flange on the said basin, both being concentric to the shaft B. The shaft is represented as having its internal cavity or passage prolonged by a tube, $u$, which is secured to its lower end, and which dips into the basin H; but the shaft itself may be prolonged downward to dip similarly into the basin. Provision is afforded for adjusting the dip of the shaft into the basin by making the hangers $v$ $v$ of the pan and plate I adjustable vertically in slots in the collar $q$, and securing them by set-screws $w$ $w$. Under the outer edge of the plate I is an annular trough, J, the inner edge of which is lower than the outer one, as shown in Fig. 1, and below this trough is the tail-race K.

In the operation of this machine quicksilver may or may not be used in the pan C, according to the nature of the ore or matter to be treated; but in either case a constant flow of water into the pan is kept up, and a constant overflow takes place over the rim $a$ and through the hollow shaft.

The ore or matter is treated in a pulverized or comminuted state, and fed in slowly and continuously to the pan just behind the trunk $m$ $n$, while water is introduced into the pan on the opposite side. The whole of the contents of the pan is kept agitated by the rotary and jumping motions of the pan, the agitation being aided by the agitating-blades D E, which, by their counteraction of the effect of centrifugal force, tend to keep the matters in suspension, the tendency toward the outer circumference of the pan being greater in the heavier solid matters, and the tendency toward the central overflow being greater in the lighter matters.

In this operation the blades D, which simply skim the surface of the body of water or other material, cause the lighter or floating solid or slimy matters to overflow with the water through the hollow shaft, and the heavier matters, while being continually lifted up, turned over, and kept agitated for a considerable time by the blades E, which dip deeper into the pan, slowly work toward the outer circumference of the pan, finally settling near the rim or sides $b$ in a comparatively compact condition, in which condition they are, by the rotation of the pan, caused to be easily scooped up by and carried through the trunk $m$ $n$ over and out of the pan.

If the ore treated be auriferous and quicksilver be used in the pan, it will serve two purposes—viz., that of taking up much of the gold, and at the same time will keep most of the material in a loose and floating condition of suspension between the centrifugal action of the pan and centripetal action of the blades E D. The water and solid matter carried over with it through the hollow shaft into the basin H rises through and overflows the basin and flows over the plate I into the annular trough J, from which it overflows to the tail-race K. Quicksilver being contained in the pan H to a depth above the bottom of the shaft or its prolonging-tube $u$, and the plate I being of copper and coated with quicksilver, and the trough J also containing quicksilver, some of the gold or metallic matters which are capable of amalgamation is captured in the basin—some by the quicksilver on the plate I and some in the trough J.

I claim—

1. The combination, with a rotary pan having a hollow upright shaft and provision for a central overflow through said shaft, of two sets of blades arranged within said pan with their faces and lower edges oblique to the radius thereof, those of one set being arranged at such level that their edges will skim the surface of the contents of the pan and those of the other set at such level that they will dip deeper into the contents of the pan, substantially as herein described.

2. The combination, with the hollow shaft of the rotary pan, of a collar on the upper part of said shaft, a bearing for the said collar, a series of anti-friction rollers attached to the lower part of said shaft, and a lower bearing, with a series of stationary inclined steps below the said rollers, the whole arranged substantially as herein described, whereby the shaft, when in its lowest position, is supported by the upper collar and the rollers are out of contact with their steps and lower bearing, as herein described.

3. In combination with a rotary washing or concentrating pan, a stationary trunk, $m$ $n$, a portion, $m$, of which, situated over the pan, occupies an inclined position tangential thereto, and the upper portion, $n$, of which is at an angle to the said portion $m$, and extends outward over the outer rim of the pan, substantially as herein shown and described.

4. The combination, with the rotary pan and its hollow central shaft, of the pan H and the amalgamating or distributing plate I, both attached to said shaft, substantially as and for the purpose herein set forth.

5. The combination of the rotary pan and its hollow shaft, the pan H, the distributing or amalgamating plate I, attached to said shaft, and the fixed annular trough J, all substantially as herein described.

FREDERICK J. SEYMOUR.

Witnesses:
 HENRY T. BROWN,
 FREDK. HAYNES.